CHARLES STADELMANN.
Improvement in Glass Molds.

No. 115,377.        Patented May 30, 1871.

Witnesses
R. C. Henshaw
Jas. I. Kay

Inventor
Charles Stadelmann
by Bakewell Christy & Kerr
his attorneys

UNITED STATES PATENT OFFICE.

CARL STADELMANN, OF PITTSBURG, PENNSYLVANIA

IMPROVEMENT IN GLASS-MOLDS.

Specification forming part of Letters Patent No. 115,377, dated May 30, 1871.

*To all whom it may concern:*

Be it known that I, CARL STADELMANN, of Pittsburg, in the county of Allegheny and State of Pennsylvania, have invented a new and useful Improvement in Glass-Molds; and I do hereby declare the following to be a full, clear, and exact description thereof, reference being had to the accompanying drawing forming part of this specification, in which—

Figure 1:
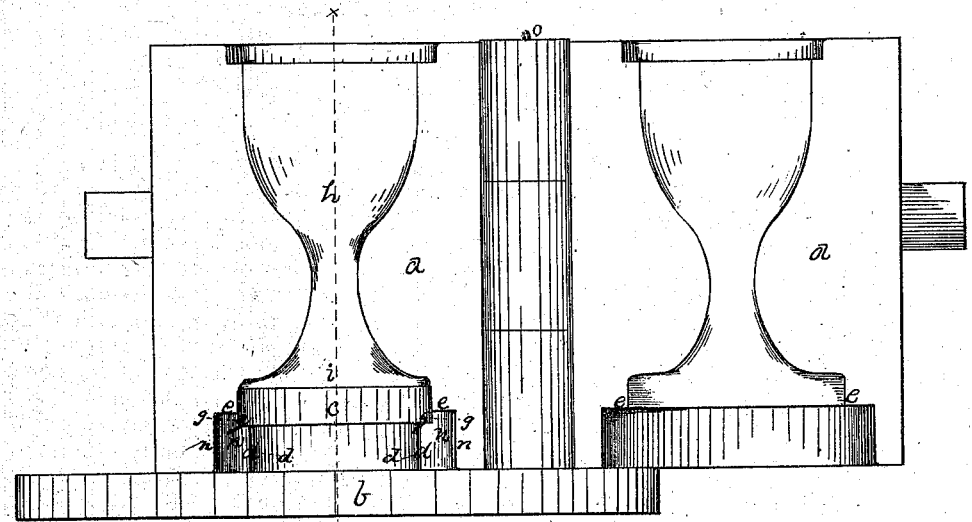
Figure 2:
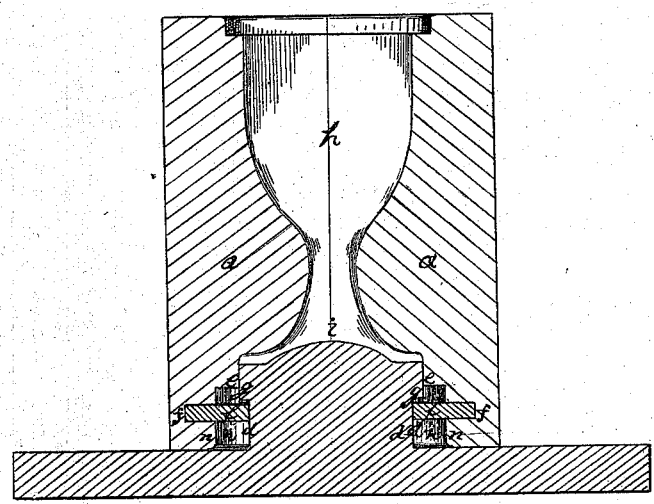

Figure 1 is a front view of a glass-mold embodying my improvement, the mold being opened; and Fig. 2 is a sectional view through $x\ x$, Fig. 1, the mold being closed.

Like letters of reference indicate like parts in each.

In glass molds as heretofore made the bottom core of the mold is narrow at the base and wide at the top, shaped in general like an inverted cone, or with a projecting shoulder running around it; and the mold has an inward projection or shoulder around its lower inner edge, of shape corresponding to that of the bottom core, so that when the parts of the mold are closed the shoulder fits snugly in around the bottom core, forming a perfectly tight joint. One reason for this form of bottom connection is to hold the mold rigid when the plunger descends into it to press the glass into shape. There are several very serious objections to molds thus made. In the first place the mold must fit exactly around the bottom core or a perfect article of glass-ware cannot be made therein, for if the mold is not entirely closed a fin is formed on the side of the glass and around the edge of the foot. To make a perfect joint it is necessary to grind the surfaces of the mold and bottom where they come in contact with each other. This is a work of time and difficulty. Again, in using a mold chips of glass fall on the bottom plate between the closing side and the bottom plug, so that the mold cannot be completely closed, and as these chips or splinters of glass are squeezed in between the core and the sides of the mold they cut the bottom and sides in such a way as to completely ruin the mold in a short time; and, lastly, as the mold is held rigidly down to the bottom plate, in case an excess of glass is put in the mold cavity, the plunger descending therein, no provision having been made for the escape of the excess, is either broken itself or breaks the mold.

All these difficulties are overcome by my improvement, which consists, first, in making a cavity around the bottom core for receiving the splintered glass between the core and the sides of the mold by grooving out either the sides of the mold, or the sides of the core, or the bottom plate around the edge of the core; and, second, in so connecting the mold when closed with the core as to leave the mold free to be raised slightly from the bottom plate.

To enable others skilled in the art to make and use my improvement I will describe its construction and manner of use.

I make an ordinary-shaped two-part mold, $a$, hinged to the pin $o$ upon the bottom plate or stand $b$. On the stand $b$ is the bottom core $c$, made straight, with a groove, $d$, running around its lower end. At the inner edge of the mold $a$, running around the mold, is a groove, above which is a shoulder, $e$, which, when the two sides of the mold close around the core or foot $c$, comes against the straight sides of the bottom and forms a tight joint, below which is the cavity $u$, formed by the conjunction of grooves in the core $c$ and mold $a$. In the old shape of mold this shoulder rested upon the top of the core $c$, and there formed the joint around the outer edge of the foot cavity $i$. This joint being horizontal the glass is pressed in between the two faces and forms a pin. In my mold no pin is formed, for the joint is vertical, so that the glass which is pressed outward cannot enter it, but comes against the vertical side of the mold. When the two parts of the mold $a$ are closed around the core $c$ they sweep all splinters or chips of glass into the cavity, thus obviating a great objection to the use of all closing and sliding molds. The pins $f\ f$, which extend from the sides of the mold into the groove in the core $c$ below the annular shoulder $g$ of the core, are to prevent the mold from rising clear off of the core, and yet are so far below the shoulder $g$ as to allow of a slight vertical movement of the mold. In case too much glass is put into the mold cavity $h$ when the plunger descends, the excess of glass being pressed down into the foot-cavity $i$ raises or presses up the mold until the pins $ff$ come against the annular shoulder $g$, enlarging the foot cavity to receive the excess, the only bad result of the excess being an increased thickness of the foot of the article of glass-ware.

The shape of the bottom core $c$ may be varied when done in such manner as to leave a cavity at the bottom of the mold for the splintered glass, and to make the shoulder $e$ form a tight joint with the side of the core above the cavity $n$.

One of the advantages of my improvement is the great saving of time accomplished in making the bottom. An ordinary workman can make one of my improved shape in about one hour, while the old kind required from five to seven hours' time, the grinding being a work of difficulty and great nicety. In case the top of the core becomes worn by use it may be reset by grinding it down.

What I claim as my invention, and desire to secure by Letters Patent, is—

1. A glass-mold having a cavity or groove around its lower inner face, between it and the bottom core, whether made in the face of the mold, or in the side of the core, or in the bottom plate, or in any two, or all of them, for the purposes described.

2. In a glass-mold, the pins $ff$, in connection with the shoulder $g$, or their equivalents, substantially as and for the purposes described.

3. The bottom core $c$ extending up into the foot cavity $i$, whereby the joint formed by the contact of the outer face of the former and the inner face of the latter shall be vertical instead of horizontal, substantially as and for the purposes set forth.

In testimony whereof I, the said CARL STADELMANN, have hereunto set my hand.

CARL STADELMANN.

Witnesses:
 THOS. B. KERR,
 W. N. HOWARD.